United States Patent
Fleming et al.

(10) Patent No.: US 11,897,702 B2
(45) Date of Patent: Feb. 13, 2024

(54) PARCEL TRANSFER SYSTEM

(71) Applicant: Material Handling Systems, Inc., Mt. Washington, KY (US)

(72) Inventors: Michael Thomas Fleming, Waxhaw, NC (US); Robertus Arnoldus Adrianus Schmit, West Bloomfield, MI (US)

(73) Assignee: Material Handling Systems, Inc., Mt. Washington, KY (US)

( * ) Notice: Subject to any disclaimer, the term of this patent is extended or adjusted under 35 U.S.C. 154(b) by 684 days.

(21) Appl. No.: 17/142,795

(22) Filed: Jan. 6, 2021

(65) Prior Publication Data

US 2021/0206582 A1 Jul. 8, 2021

Related U.S. Application Data

(60) Provisional application No. 62/957,633, filed on Jan. 6, 2020.

(51) Int. Cl.
*B65G 47/50* (2006.01)

(52) U.S. Cl.
CPC ...... *B65G 47/50* (2013.01); *B65G 2201/0285* (2013.01)

(58) Field of Classification Search
CPC .................. B65G 47/50; B65G 2201/0285
See application file for complete search history.

(56) References Cited

U.S. PATENT DOCUMENTS

| 2004/0111339 | A1 | 6/2004 | Wehrung et al. |
| 2015/0360877 | A1* | 12/2015 | Shin ...................... G06V 20/64 |
| | | | 382/103 |
| 2016/0221755 | A1* | 8/2016 | Sullivan ............... G05D 1/0272 |
| 2017/0260008 | A1* | 9/2017 | DeWitt ..................... B07C 5/36 |

(Continued)

FOREIGN PATENT DOCUMENTS

| KR | 10-0825117 B1 | 4/2008 |
| KR | 10-2015-0142923 A | 12/2015 |

(Continued)

OTHER PUBLICATIONS

Canadian Intellectual Property Office, Examiner's Report issued in corresponding Application No. 3,166,414, dated Sep. 29, 2023.

(Continued)

*Primary Examiner* — Kyle O Logan
(74) *Attorney, Agent, or Firm* — Stites & Harbison, PLLC; David W. Nagle, Jr.; Gary N. Stewart (57) ABSTRACT

A parcel transfer system transfers a parcel or a similar article directly between a conveyor and a self-driving vehicle ("SDV") while the conveyor and SDV are moving. The conveyor, SDV, or both may be configured to initially transport a parcel in a first direction of travel and then subsequently offload the parcel in a second direction of travel. The SDV is configured to travel alongside of the conveyor in the first direction of travel and either receive the parcel as it is offloaded from the conveyor or offload the parcel onto the conveyor in the second direction of travel. The parcel transfer system further includes a vision and control subsystem, which regulates movement of the SDV and offloading of the parcel from the conveyor or SDV.

16 Claims, 10 Drawing Sheets

(56) References Cited

U.S. PATENT DOCUMENTS

2019/0135551 A1\* 5/2019 Sekich ................... B65G 43/00

FOREIGN PATENT DOCUMENTS

| KR | 10-2019-0090086 A | 7/2019 |
|----|-------------------|--------|
| WO | 2012/083055 A1 | 6/2012 |

OTHER PUBLICATIONS

Korean Intellectual Property Office, International Search Report and Written Opinion issued in corresponding Application No. PCT/US2021/012324, dated Apr. 29, 2021.

Scaletronic APS. Parcel Mini-Sorter. YouTube, <https://www.youtube.com/watch?v=WFM_WcVR-vU>, Jun. 7, 2017 (retrieved on Mar. 25, 2021).

\* cited by examiner

PARCEL TRANSFER SYSTEM

CROSS-REFERENCE TO RELATED APPLICATIONS

The present application claims priority to U.S. Patent Application Ser. No. 62/957,633 filed on Jan. 6, 2020, the entire disclosure of which is hereby incorporated by reference.

BACKGROUND OF THE INVENTION

The present invention relates to the handling of parcels or similar articles within a shipping, sorting, or similar facility. In particular, the present invention relates to a parcel transfer system for transferring parcels or similar articles directly between a conveyor and a self-driving vehicle while the conveyor and self-driving vehicle are moving.

In shipping and sorting facilities, parcels or similar articles are often unloaded onto a conveyor for subsequent processing. Although self-driving vehicles ("SDVs") are commonly used in shipping and sorting facilities to transport parcels or similar articles, it is difficult to offload parcels or similar articles laterally from the conveyor directly onto an SDV without manual intervention or stopping the conveyor to offload the parcel or similar article. A common solution is to drop the parcels or similar articles off of the end of the conveyor onto a lower-positioned SDV; however, this solution is generally not suitable for fragile items which can break when dropped.

SUMMARY OF THE INVENTION

The present invention is a parcel transfer system for transferring parcels or similar articles directly between a conveyor and a self-driving vehicle ("SDV") while the conveyor and SDV are moving.

A parcel transfer system includes a conveyor and a SDV. In some implementations, the conveyor may be configured to initially transport the parcel in a first direction of travel and then offload the parcel in a second direction of travel onto the SDV. In other implementations, the SDV may be configured to initially transport the parcel in the first direction of travel and then offload the parcel in the second direction of travel onto the conveyor. In some implementations, both the conveyor and the SDV may be configured to transport a parcel in the first direction of travel and offload the parcel in the second direction of travel. In all implementations, the SDV is configured to travel alongside of the conveyor in the first direction of travel and either receive the parcel as it is offloaded from the conveyor or offload the parcel onto the conveyor in the second direction of travel, depending on the implementation, thereby eliminating the need for an intermediate sorter between the conveyor and the SDV. Moreover, in all implementations, both the conveyor and the SDV remain moving in the first direction of travel while the parcel is offloaded in the second direction of travel to prevent slowdowns with respect to the sorting and/or processing of other parcels on the conveyor and/or SDV.

The parcel transfer system further includes a vision and control subsystem, which regulates movement of the SDV and offloading of the parcel from the conveyor or SDV. The vision and control subsystem includes one or more sensors configured to acquire data corresponding to the positioning of a parcel on the conveyor. The vision and control subsystem further includes a controller which is operably connected to the one or more sensors and the SDV and analyzes data received from the one or more sensors and the SDV to identify the position of the SDV relative to a parcel located on the conveyor or a target zone of the conveyor in which a parcel carried by the SDV is intended to be offloaded.

In implementations in which the parcel is to be offloaded from the conveyor onto the SDV, the controller communicates instructions to the SDV which cause the SDV to move toward the parcel based on the determined position of the SDV relative to the parcel on the conveyor, and then communicates instructions to the conveyor which cause the conveyor to offload the parcel in the second direction of travel, while both the conveyor and SDV simultaneously move in the first direction of travel. In implementations in which the parcel is to be offloaded from the SDV onto the conveyor, the controller communicates instructions to the SDV which cause the SDV to move toward the conveyor based on the determined position of the SDV relative to a target zone of the conveyor, and then communicates instructions to the SDV which cause the SDV to offload the parcel in the second direction of travel onto the conveyor, while the SDV and conveyor simultaneously move in the first direction of travel. In instances where the data received from the one or more sensors of the vision and control subsystem and the SDV indicate that the SDV is not in a side-by-side position either with the parcel on the conveyor or a target zone of the conveyor, the controller preferably communicates instructions to the SDV which cause the SDV to reach and maintain a side-by-side position with the parcel or the target zones of the conveyor prior to communicating instructions which cause the parcel to be offloaded.

To prevent the parcel from "dropping" when offloaded from either the conveyor onto the SDV or from the SDV onto the conveyor, the upper surfaces of the conveyor and the SDV on which the parcel is carried are preferably in a common plane as the parcel is being offloaded.

In some embodiments, the conveyor is an activated roller belt including a belt and rollers (which can also be in the form of or characterized as balls) integrated within the belt. The belt of the conveyor is configured to be driven, preferably continuously, in the first direction of travel, while the rollers can be simultaneously selectively activated to either offload a parcel from the conveyor onto the SDV or to assist in moving the parcel off of the SDV.

In some embodiments, the upper surface of the SDV which receives and carries parcels loaded thereon, is defined by a secondary conveyor which can be selectively activated to offload parcels onto or move parcels off of the conveyor in the second direction of travel. In some embodiments, the secondary conveyor includes multiple zones, which can be selectively activated to offload or move a parcel in the second direction of travel. For instance, in one such embodiment, the secondary conveyor may be defined by a first belt and a second belt, which can be selectively activated to be driven simultaneously or independent of each other.

DETAILED DESCRIPTION OF THE INVENTION

The present invention relates to a parcel transfer system for transferring parcels or similar articles directly between a conveyor and a self-driving vehicle while the conveyor and the self-driving vehicle are moving.

FIGS. 1 and 1A-D are various schematic diagrams of one implementation of an exemplary parcel transfer system 10 (or system 10) made in accordance with the present invention.

As shown in FIGS. 1 and 1A-D, the parcel transfer system 10 generally includes a conveyor 20 and a self-driving vehicle ("SDV") 30.

It is important to recognize that, in the discussion that follows and in the claims of the present application, "self-driving vehicle" means any autonomous vehicle whose movement is not dependent upon human operation, and which is capable of transporting and offloading and/or receiving parcels or similar articles in the manner specified within the present disclosure. For instance, in some embodiments, the SDV 30 may be an automated guided vehicle ("AGV"), while, in other embodiments, the SDV 30 may be an autonomous mobile robot ("AMR").

It is also important to recognize that, in the discussion that follows and in the claims of the present application, the term "parcel" is not intended to be limiting and can include any article, item, or object that may be transported, offloaded, and/or received in the manner specified within the present disclosure.

Referring still to FIGS. 1 and 1A-D, in this implementation, the conveyor 20 is configured to initially transport a parcel 40 in a first direction of travel (as indicated by arrows A in FIGS. 1A-D and 2A-D) and offload the parcel 40 in a second direction of travel (as indicated by arrow B in FIG. 1C) toward the SDV 30, which, in this case, is perpendicular to the first direction of travel, A. The SDV 30 is configured to travel alongside the conveyor 20 in the same first direction of travel, A, which, in this case, is in a longitudinal direction of travel extending along a length of the conveyor 20. The SDV 30 is further configured to travel to a side-by-side position with the parcel 40 and receive the parcel 40 as it is offloaded from the conveyor 20. As the parcel 40 is offloaded from the conveyor 20 in the second direction of travel, B, both the conveyor 20 and the SDV remain moving in the first direction of travel, A. In this way, the system 10 provides direct transfer of parcels loaded onto the conveyor 20 to the SDV 30 without having to stop or slow the conveyor 20, thereby eliminating the need for an intermediate sorter and improving parcel transfer and sorting efficiency. As further discussed below with reference to FIG. 3, offloading of the parcel 40 by the conveyor 20 and movement and other operations of the SDV 30 is based on instructions (or signals) communicated by a vision and control subsystem 100.

Referring now to FIGS. 1A-D, in this exemplary embodiment, the conveyor 20 is an activated roller belt including a belt 22 and selectively activated rollers 24 (which can also be in the form of or characterized as balls) integrated within the belt 22. The belt 22 is configured to be driven in the first direction of travel, A, for example, via operation of a motor (not shown) operably connected to the belt 22. To improve processing efficiency, the belt 22 is preferably continuously driven during operation of the system 10 so that parcels which are not ready for offloading can continue to progress in the first direction of travel, A, while other parcels are simultaneously offloaded in the second direction of travel, B, onto the SDV 30. When activated, the rollers 24, rotate in the second direction of travel, B, to direct any parcel located thereon off of the conveyor 20, as further described below.

Referring still to FIGS. 1A-D, unlike the belt 22, the rollers 24 of the conveyor 20 are not continuously activated. Rather, the rollers 24 are selectively activated (e.g., via activation of one or more belts or carryways below and in contact with a lower surface of the respective rollers 24) by a controller 60 (FIG. 3) to regulate which parcels on the conveyor 20 are offloaded at a given time. In this regard, subsets of rollers 24 corresponding to (i.e., in contact with) the respective belts or carryways can be characterized as falling within different spatial sections (or zones) 25a, 25b, 25c along the conveyor 20, and the controller 60 can communicate instructions to selectively activate only the subset(s) of rollers 24 in zone(s) 25a, 25b, 25c of the conveyor 25 in which a parcel 40 ready for offloading is located. As the belt 22 carrying the rollers 24 is driven in the first direction of travel, A, during operation, it is appreciated that the rollers 24 will be positioned in different zones at different times. As such, a roller 24 in one zone (e.g., the third zone 25c) at a first time will move into another zone (e.g., the second zone 25b) at a second time. In FIGS. 1A-D, three different zones 25a, 25b, 25c are illustrated for sake of example: a first zone 25a; a second zone 25b; and a third zone 25c, which, in this case, the parcel 40 intended for offloading is initially positioned. Of course, the subsets of rollers 24 and/or the one or more belts or carryways responsible for activating the rollers 24, and thus the number and/or sizes of zones 25a, 25b, 25c, of the conveyor 20 can be adjusted to accommodate particular environments or sorting applications. The rollers 24 are preferably bidirectional rollers 24, such that each roller 24 can be driven in a first (forward) direction to move parcels located thereon off of the conveyor 20 or a second (backward) direction to move parcels onto the conveyor 20 (as further described below with reference to FIGS. 2A-2D).

Referring now again to FIGS. 1 and 1A-D, as noted above, in this implementation, the SDV 30 includes an upper surface which receives and subsequently carries the parcel 40 offloaded from the conveyor 20. To prevent the parcel 40 from becoming hung on the conveyor 20 during offloading, and thus not fully transferring to the SDV 30, in this exemplary embodiment, the upper surface of the SDV 30 is defined by a secondary conveyor 32, which is selectively activated and driven based on instructions (or signals) from the controller 60 (as further described below). In use, the secondary conveyor 32 can be selectively activated and driven to rotate in the second direction of travel, B, to assist in moving the parcel 40 away from the conveyor 20 as it is offloaded therefrom.

As shown, e.g., in FIGS. 1A-D, in this exemplary embodiment, the secondary conveyor 32 is defined by, and thus can be characterized as including, a first belt 32a and a second belt 32b. The first belt 32a and the second belt 32b can be simultaneously or independently driven based on instructions from the controller 60 (as further described below). For instance, simultaneous operation of the first belt 32a and second belt 32b may prove useful in applications where a larger parcel is being offloaded from the conveyor 20. In other instances, sequential operation of the first belt 32a and the second belt 32b may prove useful in instances where it would be desirable for the SDV 30 to receive and subsequently transport multiple parcels from the conveyor 20. In this regard, the first belt 32a and the second belt 32b of the secondary conveyor 32 can also be characterized as different spatial sections (or zones) of the secondary conveyor 32, which can be selectively activated to facilitate parcel transfer. One of skill in the art will appreciate, however, that the number of belts defining the secondary conveyor 32 of the SDV 30 can be adjusted to better accommodate specific sorting applications and/or environments. As such, embodiments in which the secondary conveyor 32 is defined by a single belt, as well as embodiments in which the secondary conveyor 32 is defined by more than two belts, are contemplated within the present disclosure. The secondary conveyor 32 is preferably a bidirectional conveyor, such that the first belt 32a and the second belt 32b can each be driven in a first (backward) direction to move parcels off of the conveyor 20 and a second (forward) direction to move parcels onto the conveyor 20 (as further described below with reference to FIGS. 2A-D).

Although the secondary conveyor 32 is generally identified throughout the present disclosure as a belt conveyor defined by a first belt 32a and a second belt 32b, one of skill in the art will appreciate that the secondary conveyor 32 may be alternatively constructed or defined without departing from the spirit and scope of the present invention. For instance, in alternative embodiments, the secondary conveyor 32 can be defined by one or more roller conveyors or one or more automated platforms that can be selectively activated to help move a parcel toward or away from the conveyor 20.

Figure 3:
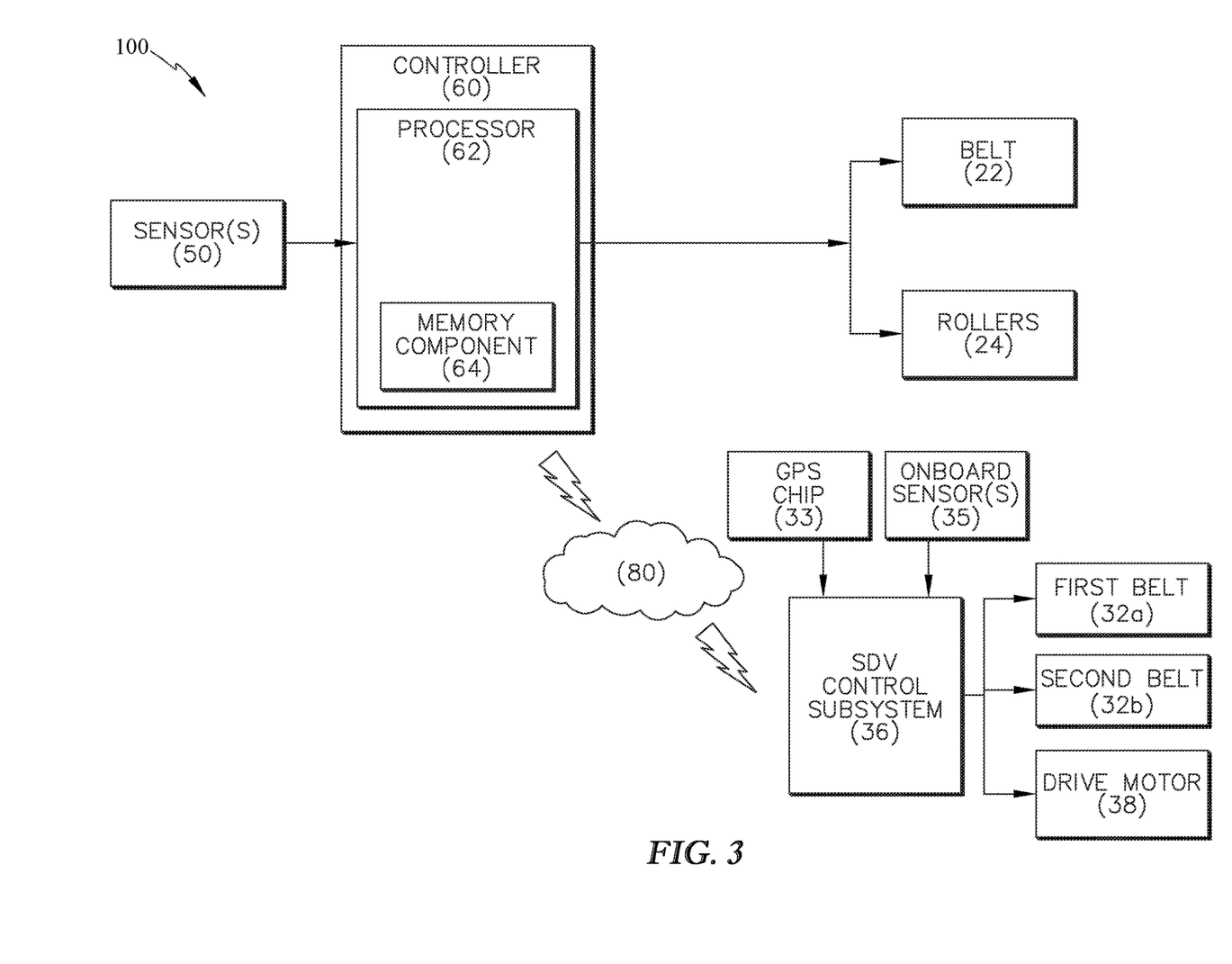
FIG. 3 is a schematic diagram of a vision and control subsystem for use in the exemplary parcel transfer system of FIG. 1.

FIG. 3 is a schematic diagram of a vision and control subsystem 100 for use within the system 10.

Referring now to FIGS. 1, 1A-D, and 3, the vision and control subsystem 100 is configured to control at least activation of the rollers 24 of the conveyor 20, movement of the SDV 30, and activation of the secondary conveyor 32. To this end, the vision and control subsystem 100 includes one or more sensors 50 which are configured and positioned to acquire data corresponding to the positioning of parcels in one or more of the zones 25a, 25b, 25c of the conveyor 20. In this exemplary embodiment, the one or more sensors 50 includes a camera that is positioned to have the first zone 25a, the second zone 25b, and the third zone 25c of the conveyor 20 within its field of view, as indicated by the dashed lines shown in FIGS. 1A-D. The camera is configured to acquire two-dimensional and/or three-dimensional image data either on command (for example, in response to electronic signal or similar trigger) or substantially continuously. In some implementations, the field of view of the camera may further include the non-conveyor area adjacent to a zone 25a, 25b, 25c along which the SDV 30 may travel. Suitable cameras for use in the present invention include three-dimensional image sensors manufactured and distributed by ifm Efector Inc. of Malvern, Pennsylvania.

In alternative embodiments, the one or more sensors 50 of the vision and control subsystem 100 may include a photoelectric sensor configured to detect the distance, presence, or absence of the parcel 40 by using a light transmitter and a photoelectric receiver. In some embodiments, the one or more sensors 50 of the vision and control subsystem 100 may include a plurality of sensors defined by a combination of both photoelectric sensors and cameras.

Referring still to FIGS. 1, 1A-D, and 3, the vision and control subsystem 100 further includes a controller 60 to which the one or more sensors 50 are operably connected, such that data (e.g., image data and/or readings from a photoelectric sensor) collected by the one or more sensors 50 is transmitted to the controller 60 for subsequent processing. The controller 60 includes a processor 62 for executing instructions (routines) stored in a memory component 64 or other computer-readable medium. The rollers 24 of the conveyor 20 are operably connected to the controller 60, such that the subset of rollers 24 (or various motors of belts and/or carryways in contact therewith) in the different zones 25a, 25b, 25c of the conveyor 20 can be selectively activated (i.e., driven) and deactivated in response to instructions (signals) communicated from the controller 60. In this exemplary embodiment, the belt 22 of the conveyor 20 is also operably connected to the controller 60, such that the belt 22 (or various motors and/or actuators associated therewith) can be selectively activated and deactivated in response to instructions communicated from the controller 60. The operable connection between the belt 22 and the controller 60 is, however, optional as the belt 22 portion of the conveyor 20 can be, and preferably is, continuously driven during operation of the system 10 while still enabling the system 10 to function as intended.

Figure 1:
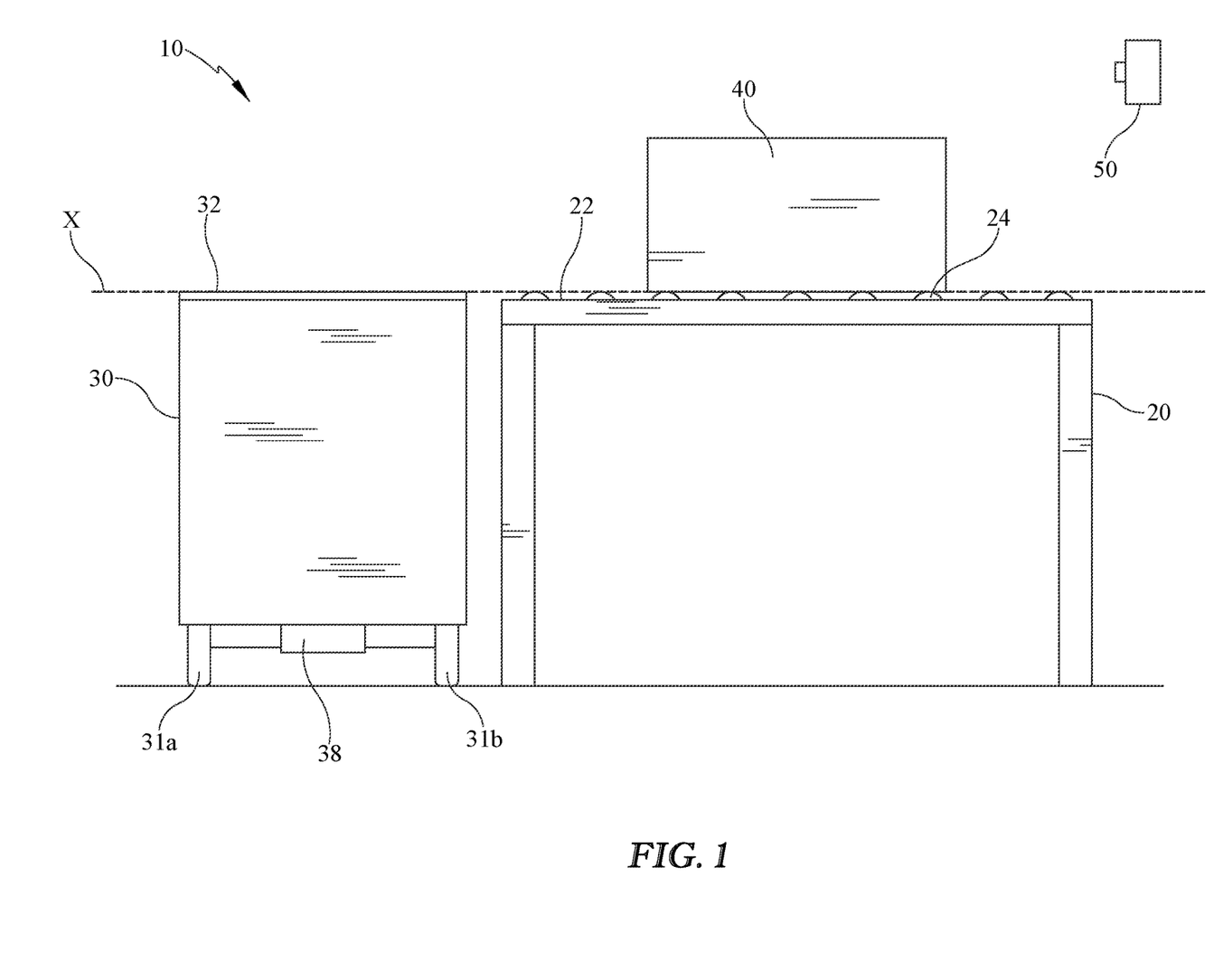
FIG. 1 is a schematic diagram of an exemplary parcel transfer system made in accordance with the present invention, with the conveyor of the exemplary parcel transfer system transporting a parcel or similar article.

Referring now to FIGS. 1 and 3, at least one pair of wheels 31a, 31b of the SDV 30 is operably connected to a drive motor 38 (e.g., via one or more axles) of the SDV 30, which can be selectively activated to rotate one or both wheels 31a, 31b to reposition the SDV 30. The drive motor 38 may comprise one or more motors, and is operably connected to the controller 60, such that the drive motor 38 can be selectively activated and deactivated to rotate one or more wheels 31a, 31b of the SDV 30 in response to instructions communicated from the controller 60. Specifically, in this exemplary embodiment, the drive motor 38 is operably connected to the controller 60 via a SDV motor control subsystem 36, which is configured to initially receive instructions communicated from controller 60, analyze the same, and communicate its own instructions which ultimately activate or deactivate the drive motor 38 (and first belt 32a and second belt 32b of the secondary conveyor 32, as further described below). In this regard, the SDV control subsystem 36 may include an onboard processor, which is operably connected to the controller 60 via a network 80 using known interfaces and protocols.

Referring now specifically to FIG. 3, in this exemplary embodiment, the first belt 32a and the second belt 32b of the secondary conveyor 32 are also operably connected to the controller 60 via the SDV control subsystem 36, such that the first belt 32a and the second belt 32b (or motors and/or actuators associated therewith) can each be selectively activated and deactivated in response to instructions communicated from the controller 60. As shown, in this exemplary embodiment, the SDV 30 also includes a GPS tracking chip 33 and one or more onboard sensors 35. The GPS tracking chip 33 is configured to provide data regarding the physical location of the SDV 30, and the one or more onboard sensors 35 are configured to detect and provide data regarding whether the SDV 30 has been loaded with a parcel. In this regard, the one or more onboard sensors 35 may include a camera, a photoelectric sensor, weight sensor, pressure sensor, or combinations thereof. In this exemplary embodiment, both the GPS tracking chip 33 and the one or more onboard sensors 35 are operably connected to the controller 60 via the SDV control subsystem 36, such that data gathered by the GPS tracking chip 33 and the data gathered by the one or more onboard sensors 35 are transmitted to the controller 60 for subsequent processing via the SDV control subsystem 36. Of course, in alternative embodiments, however, the GPS, the one or more onboard sensors 35 of the SDV 30, the first belt 32a of the secondary conveyor 32, the second belt 32b of the secondary conveyor 32, and/or the drive motor 38 may be directly connected to the controller 60 via a network 80 without the SDV control subsystem 36 acting as an intermediate interface between such components and the controller 60.

Figure 1A:
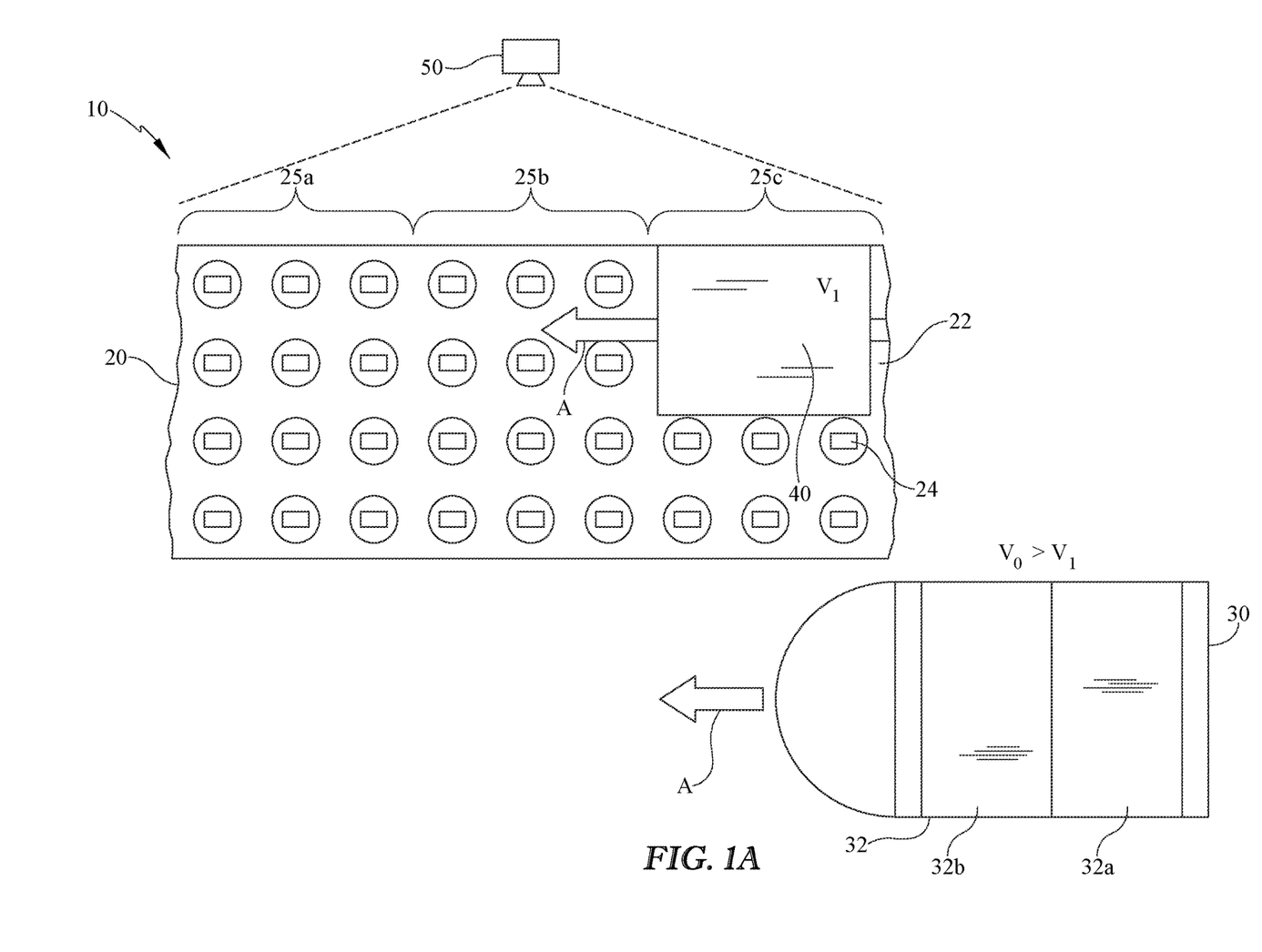
FIG. 1A is another schematic diagram of the exemplary parcel transfer system of FIG. 1.

Referring now again to FIGS. 1A-D and 3, in an exemplary implementation, the controller 60 analyzes the data received by the one or more sensors 50 of the vision and control subsystem 100 to identify in which zone(s) 25a, 25b, 25c of the conveyor 20 a target parcel ready for offloading is located. In this case, the parcel 40 is initially located in the third zone 25c of the conveyor 20 (FIG. 1A). The controller 60 also analyzes the data received by the GPS tracking chip 33 of the SDV 30 to determine the positioning of the SDV 30 relative to the parcel 40 on the conveyor 20. Once the controller 60 identifies the parcel 40 and the SDV 30 as being side-by-side, the controller 60 communicates instructions which activate the subset(s) of rollers 24 in the zone(s) of the conveyor 20 in which the parcel 40 is located, thus moving the parcel 40 in the second direction of travel, B, toward the SDV 30, as shown in FIG. 1C. To avoid inadvertent repositioning of parcels located in the other zones, it is generally preferred that only the subset(s) of rollers 24 in the zone(s) of the conveyor 20 in which the parcel 40 is located be activated at this time. As noted above, during operation of the system 10, the belt 22 of the conveyor 20 is preferably continuously driven in the first direction of travel, A. As such, the portion of the belt 22 and rollers 24 on which the parcel 40 is positioned is still moving in the first direction of travel, A, even when the parcel 40 is being offloaded in the second direction of travel, B. In this regard, and as shown by viewing FIGS. 1A-C in sequence, the parcel 40 may travel through multiple zones 25a, 25b, 25c before being offloaded onto the SDV 30. Upon identifying the SDV 30 and the parcel 40 are in side-by-side position, the controller 60 also communicates instructions to the SDV 30 which cause the first belt 32a and/or the second belt 32b of the secondary conveyor 32 to be activated and driven in the second direction of travel (as indicated by arrow B in FIG. 1C), to help move the parcel 40 away from the conveyor 20.

Referring now to FIGS. 1C and 3, after communicating instructions to activate the subset(s) of rollers 24 in the zone(s) in which the parcel 40 is located and the first belt 32a and/or second belt 32b of the SDV 30, the one or more onboard sensors 35 and, in some embodiments, the one or more sensors 50 of the vision and control subsystem 100 collect new data (e.g., readings from the photoelectric sensor, new images, weight measurements, and/or pressure measurements) and transmit the same to the controller 60 for processing. Data from the one or more onboard sensors 35 and the one or more sensors 50 of the vision and control subsystem 100 may also be transmitted to the controller 60 for processing after allowing a suitable period of time for execution of the instructions from the controller 60 by the subset(s) of rollers 24 in the zones in which the parcel 40 is located and the SDV 30 (i.e., first belt 32a and/or second belt 32b activation). The foregoing routine is repeated until the controller 60 receives data from the one or more onboard sensors 35 of the SDV 30 and/or the one or more sensors 50 of the vision and control subsystem 100 indicating that the parcel 40 has been fully offloaded from the conveyor 20 onto the SDV 30. At such time, the controller 60 then communicates instructions which (i) deactivate the subset(s) of rollers 24 in the zone(s) in which the parcel 40 was previously located, and (ii) deactivate the first belt 32a and/or second belt 32b of the secondary conveyor 32.

Referring now to FIGS. 1A-C and 3, if, however, the data received by the controller 60 from the one or more sensors 50 of the vision and control subsystem 100 indicates that the SDV 30 and the parcel 40 are not in side-by-side position, the controller 60 communicates instructions which cause the drive motor 38 of the SDV 30 to move the SDV 30 toward the parcel 40. Depending on the positioning of the SDV 30 relative to the parcel 40, the movement instructions communicated by the controller 60 may cause the SDV 30 to change directions, accelerate, or decelerate. For instance, if the controller 60 identifies that the SDV 30 is traveling alongside the conveyor 20 at a position behind the parcel 40, the controller 60 will communicate instructions which cause SDV 30 to initially accelerate in the first direction of travel, A, to a velocity (as indicated by $V_0$) which exceeds the velocity at which the parcel is traveling (as indicated by $V_1$) to approach the parcel 40. After communicating movement instructions to the drive motor 38 of the SDV 30, the GPS tracking chip 33, and, in some embodiments, the one or more sensors 50 of the vision and control subsystem 100 collect new data (e.g., physical coordinates, readings from the photoelectric sensor, and/or new images) and transmit the same to the controller 60 for processing. Data from the SDV 30 may also be transmitted to the controller 60 for processing after allowing a suitable period of time for the SDV 30 to execute the movement instructions communicated to it by the controller 60.

Figure 1B:
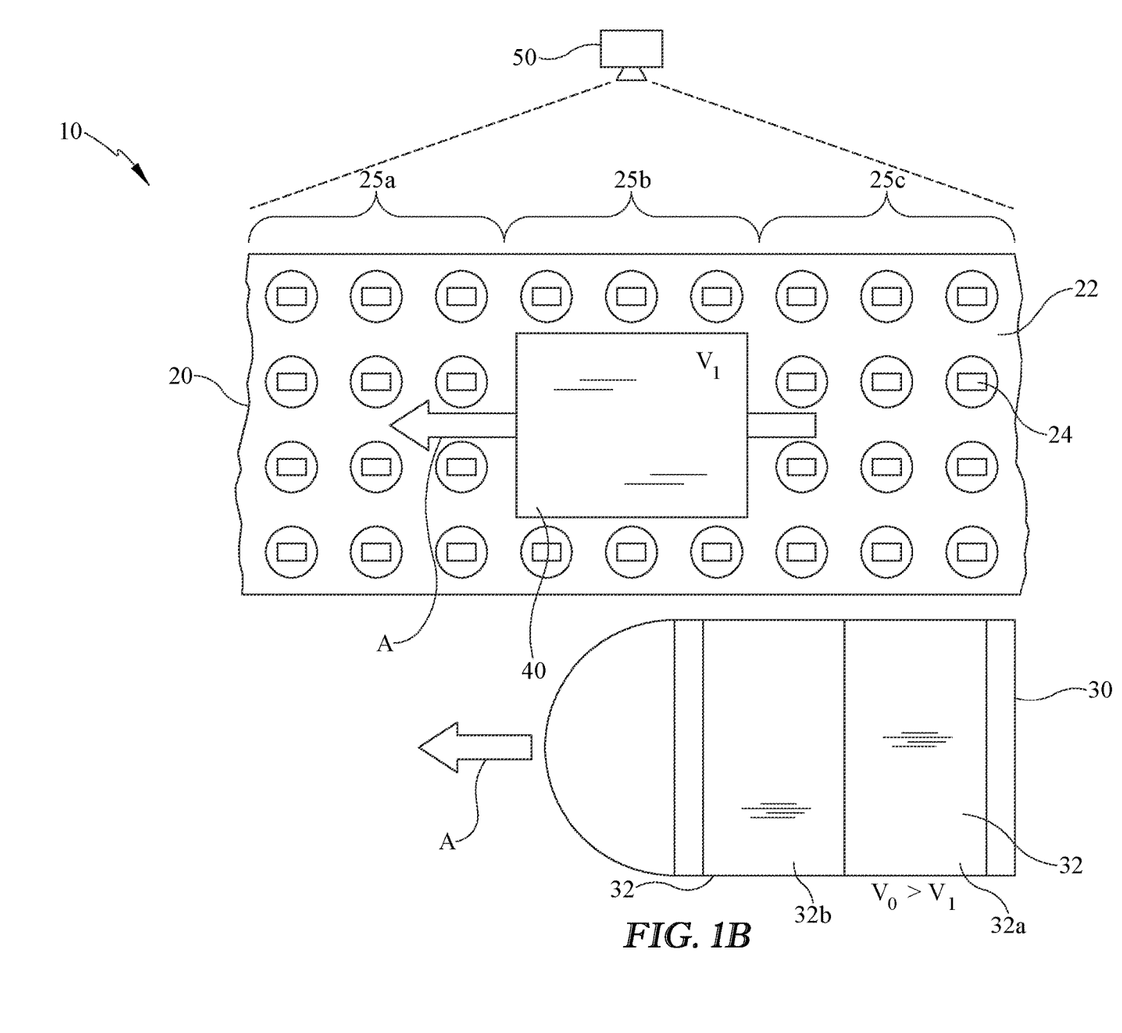
FIG. 1B is another schematic diagram of the exemplary parcel transfer system of FIG. 1 similar to FIG. 1A, but with the self-driving vehicle positioned further along a length of the conveyor.
Figure 1C:
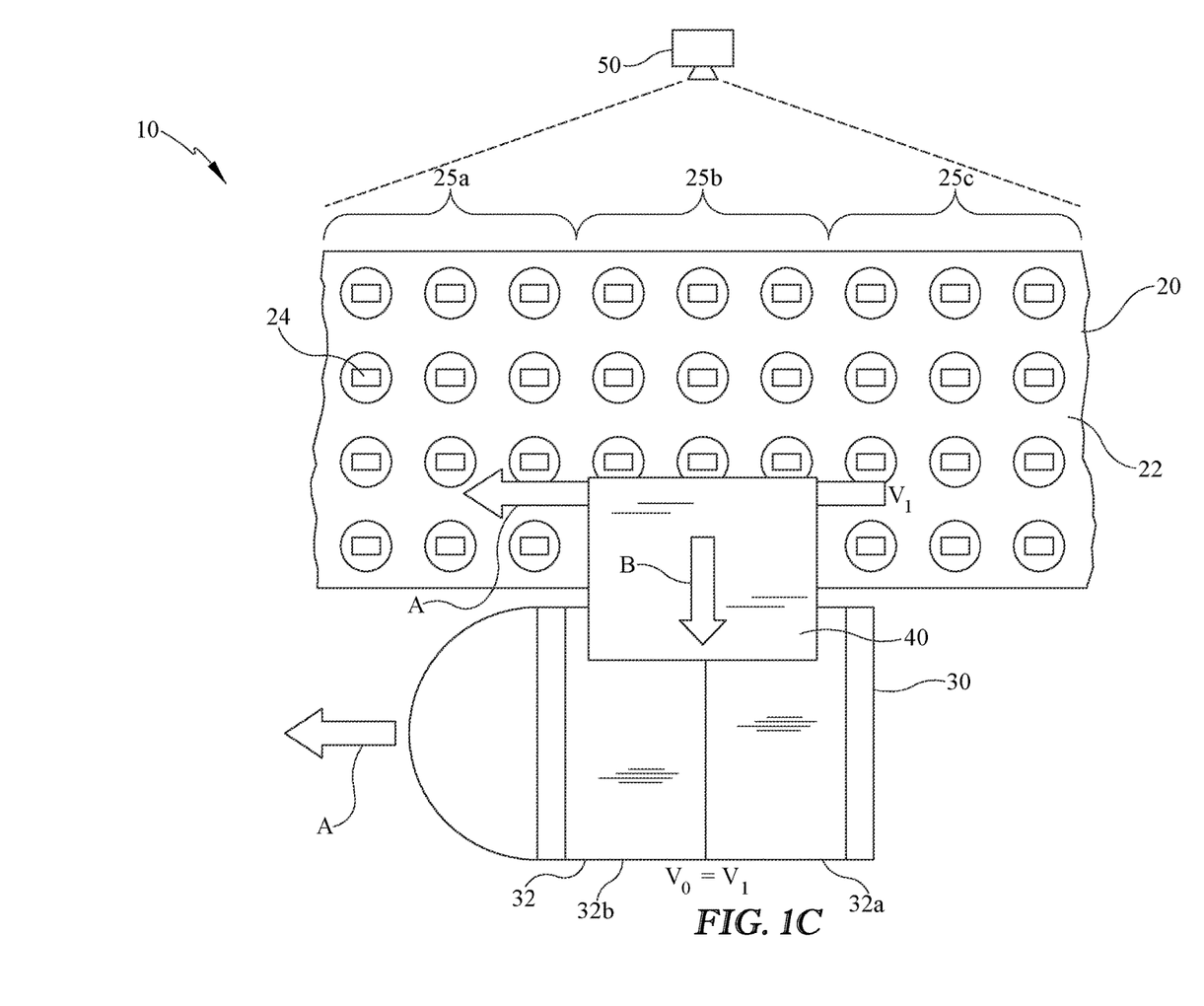
FIG. 1C is another schematic diagram of the exemplary parcel transfer system of FIG. 1 similar to FIG. 1B, but with the parcel or similar article being offloaded onto the self-driving vehicle.

As shown by viewing FIGS. 1A-C in sequence, the SDV 30 continues to travel at a velocity, $V_0$, greater than the velocity, $V_1$, at which the parcel 40 is traveling (i.e., $V_0 > V_1$) until the controller 60 receives data from the GPS tracking chip 33 and/or the one or more sensors 50 of the vision and control subsystem 100 indicating that the SDV 30 has reached a side-by-side position with the parcel 40. At this time, the controller 60 communicates instructions which (i) cause the drive motor 38 to decelerate and maintain the SDV 30 at a velocity, $V_0$, equal to that of the velocity, $V_1$, at which the belt 22 of the conveyor 20, and thus the parcel, is traveling (i.e., $V_0=V_1$), and (ii) activate the rollers 24 and the first belt 32a and/or second belt 32b of the secondary conveyor 32 in the manner specified above. In this regard, like the conveyor 20, the SDV 30 also remains moving in the first direction of travel, A, as the parcel 40 is offloaded in the second direction of travel, B. In other words, transfer occurs "on the fly," significantly reducing the time necessary to process parcels on the conveyor 20.

Figure 1D:
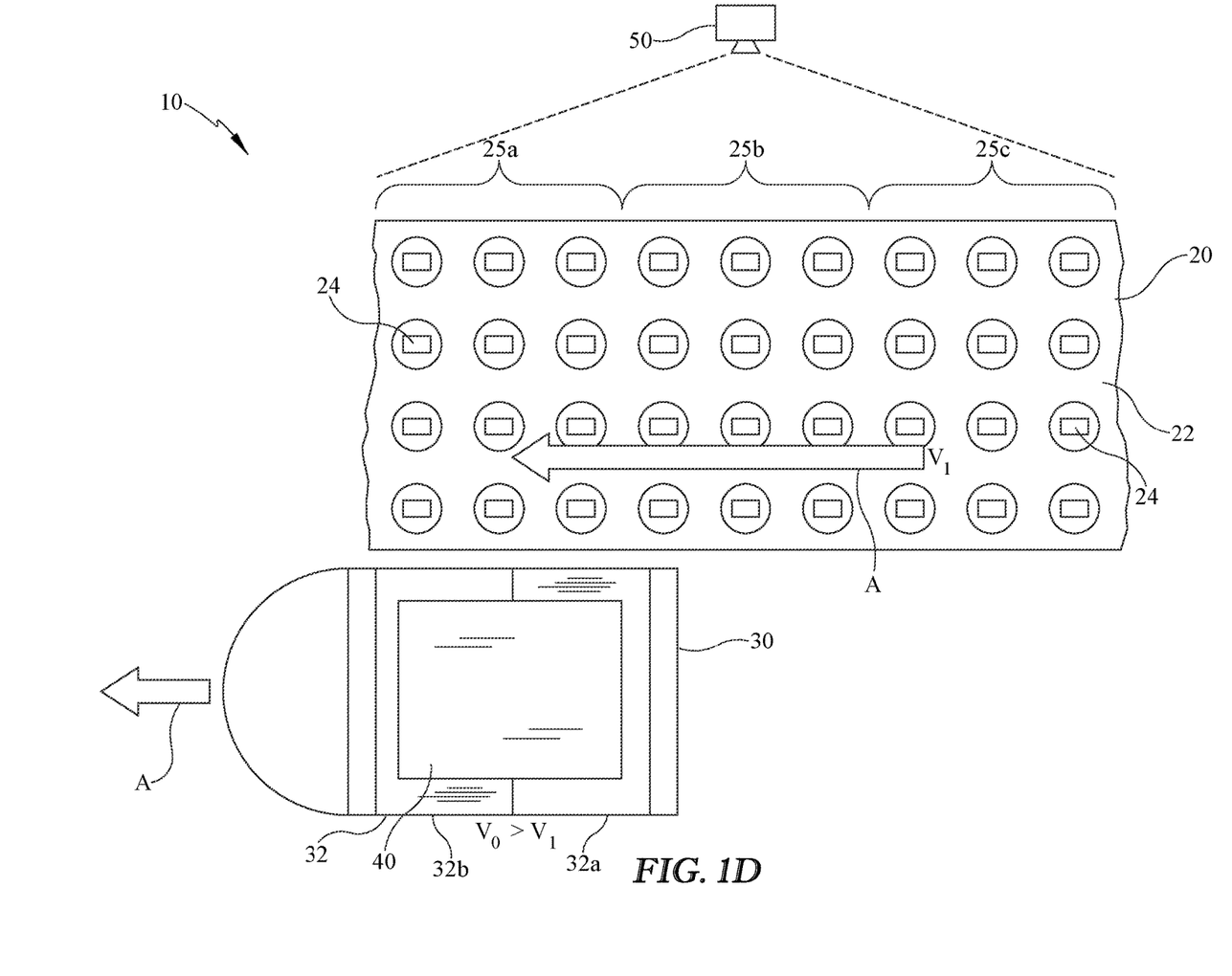
FIG. 1D is another schematic diagram of the exemplary parcel transfer system of FIG. 1 similar to FIG. 1C, but with the parcel or similar article fully offloaded onto the self-driving vehicle.

Referring now to FIGS. 1D and 3, once the controller 60 receives data from the one or more onboard sensors 35 and/or the one or more sensors 50 of the vision and control subsystem 100 indicating that the parcel 40 has been fully offloaded from the conveyor 20, the controller 60 may communicate instructions which cause the drive motor 38 to accelerate (i.e., $V_0>V_1$) and drive the SDV 30 away from the conveyor 20 to deliver the parcel 40 to its intended destination for further processing. In some implementations, the parcel 40 may be offloaded onto only one of the belts 32a, 32b of the secondary conveyor 32. In such implementations, a second parcel may be offloaded from the conveyor 20 to the unoccupied belt 32a, 32b of the secondary conveyor 32 in the same manner as described above prior to the SDV 30 driving away from the conveyor 20.

As a further refinement, in some implementations, the one or more sensors 50 can also be used to identity a failure with respect to the intended transfer of a parcel, which can trigger an immediate shutdown of the conveyor 20 and/or the SDV 30.

The foregoing process can be repeated by the system 10 to transfer and process any remaining parcels located on the conveyor 20. To process large volumes of parcels loaded onto the conveyor 20, in some embodiments and implementations, the system 10 may include multiple SDVs 30. In such embodiments and implementations, the continued movement of the respective SDVs 30 and conveyor 20 during parcel transfer in the manner described above will serve to prevent traffic congestion at parcel transfer points along the conveyor 20 while simultaneously improving parcel transfer and sorting efficiency.

FIGS. 2A-D are various schematic diagrams of another implementation of the exemplary parcel transfer system 10 of FIG. 1.

As shown in FIGS. 2A-D, the system 10 includes the same structural components as described above with reference to FIGS. 1, 1A-D and 3. In this regard, like components are provided with like reference numerals throughout the present application. However, in this implementation, the parcel 40 is initially transported by the SDV 30 and then offloaded therefrom onto the conveyor 20. To this end, the SDV 30 is thus configured to travel alongside of the conveyor 20 in the first direction of travel, A, and then, upon reaching a side-by-side position with the conveyor 20, offload the parcel 40 onto the conveyor 20 in a second direction of travel (as indicated by arrow B' in FIG. 2C), which, in this implementation, is perpendicular to the first direction of travel, A. As the parcel 40 is offloaded from the SDV 30 in the second direction of travel, B', both the SDV 30 and the conveyor 20 remain moving in the first direction of travel, A. In this way, the system 10 thus also provides direct transfer of parcels loaded onto the SDV 30 to the conveyor 20 without having to stop or slow the conveyor 20, thereby further eliminating the need for an intermediate sorter and improving parcel transfer and sorting efficiency.

Referring now to FIGS. 2A-D and 3, in this exemplary implementation, the controller 60 analyzes data received by the one or more sensors 50 of the vision and control subsystem 100 and the GPS tracking chip 33 of the SDV 30 to identify the position of the SDV 30 carrying the parcel 40 relative to the conveyor 20. Specifically, in this exemplary implementation, the controller 60 utilizes the data received from the one or more sensors 50 of the vision and control subsystem 100 to identify a target zone(s) of the conveyor 20 in which the parcel 40 is intended to be offloaded, which, in this case, is the second zone 25b of the conveyor 20. If the controller 60 identifies the SDV 30 as being in a side-by-side position with the target zone(s) of the conveyor 20, the controller 60 communicates instructions to SDV 30 which cause the first belt 32a and/or the second belt 32b of the secondary conveyor 32 to be activated and driven in the second direction of travel, B', to move the parcel 40 onto the target zone(s) of the conveyor 20. At this time, the controller 60 also communicates instructions which preferably cause only the subset(s) of rollers 24 in the target zone(s) of the conveyor 20 in which parcel 40 is intended to be offloaded to be activated and driven in the second direction of travel, B', thereby helping to move the parcel 40 off of the SDV 30. As the parcel 40 is offloaded in the first direction of travel A, both the SDV 30 and the conveyor 20 remain moving in the first direction of travel, A. Again, transfer occurs "on the fly," significantly reducing the time necessary to process parcels on the conveyor 20.

Figure 2A:
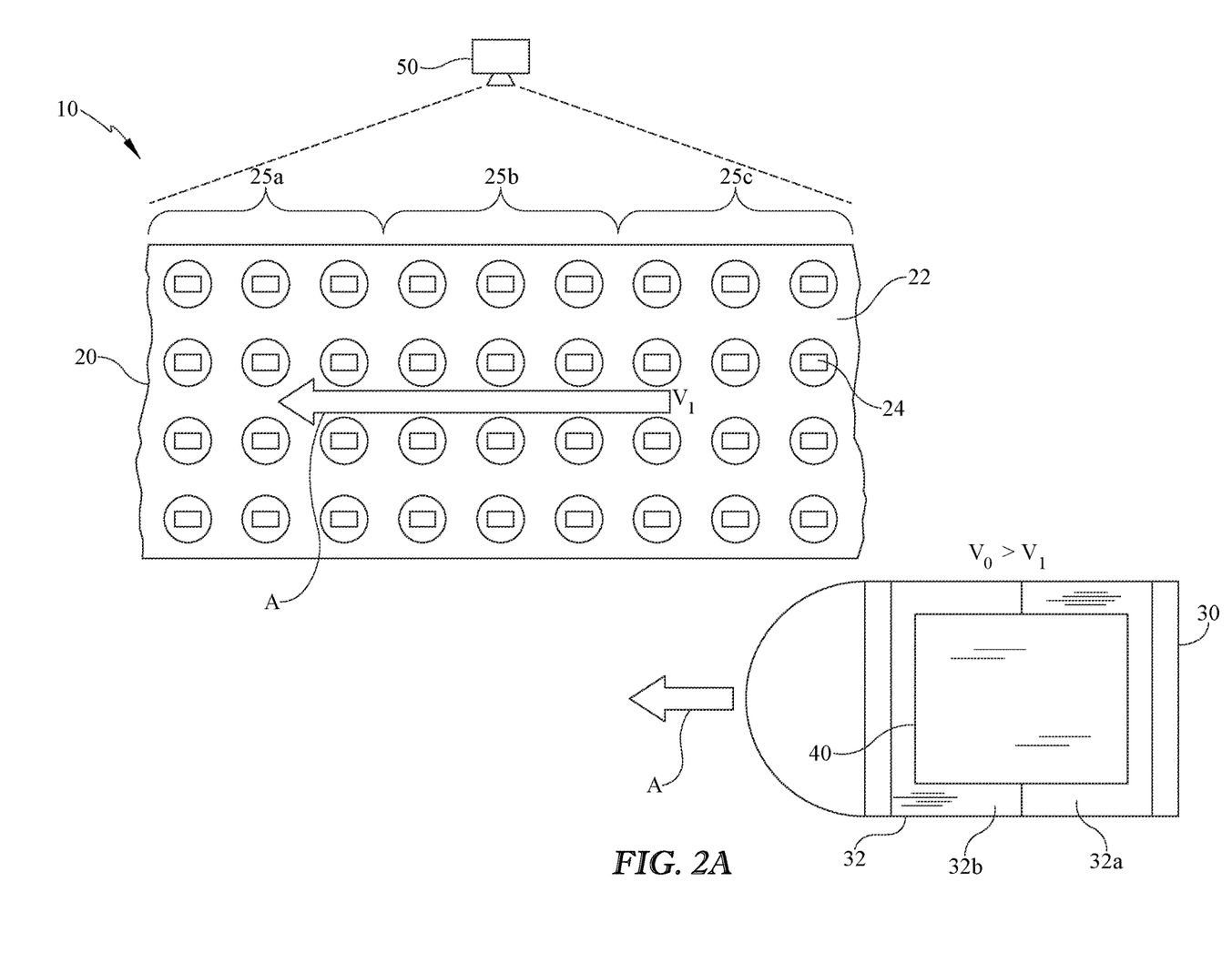
FIG. 2A is a schematic diagram of another implementation of the exemplary parcel transfer system of FIG. 1 similar to FIG. 1A, but with the self-driving vehicle initially transporting the parcel or similar article instead of the conveyor.
Figure 2B:
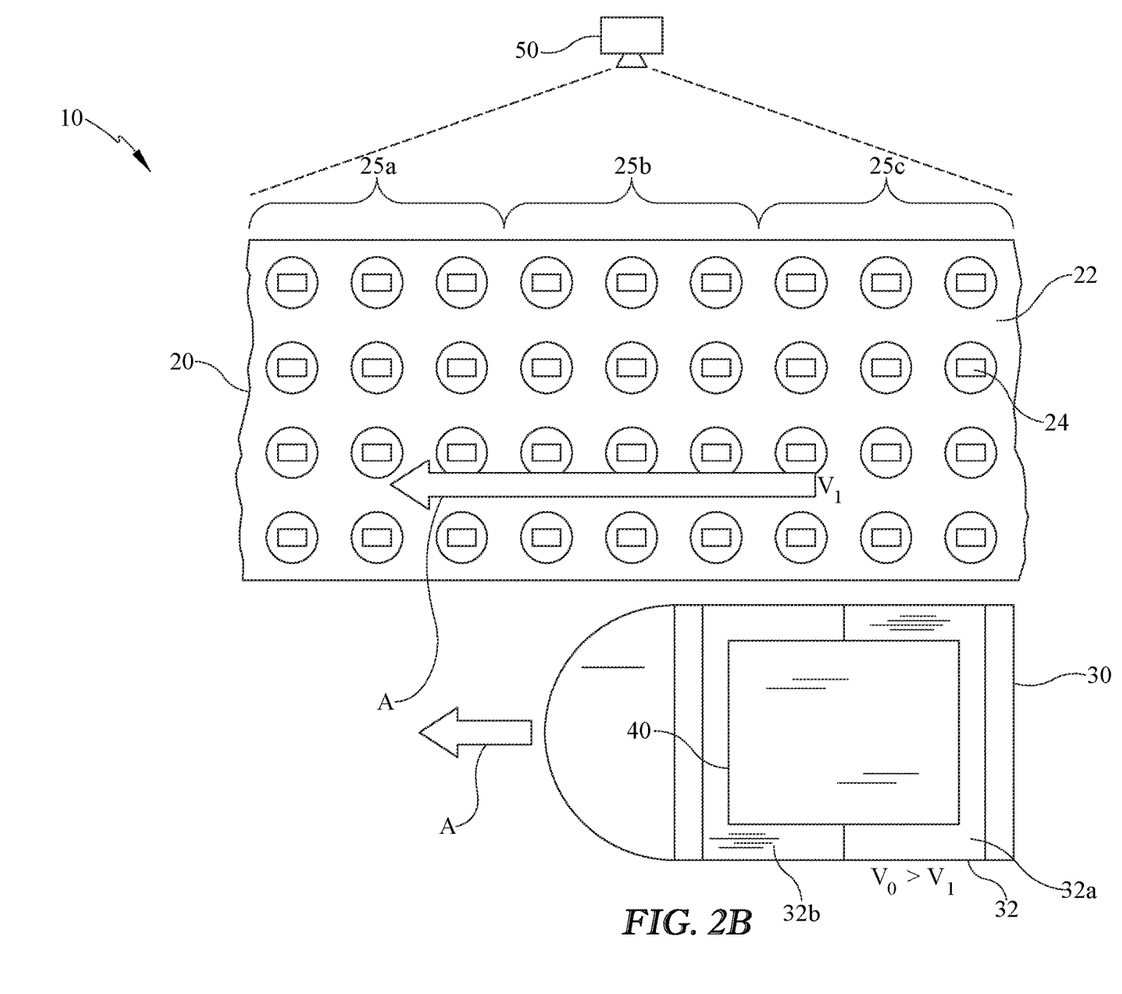
FIG. 2B is a another schematic diagram of the exemplary parcel transfer system of FIG. 1 similar to FIG. 2A, but with the self-driving vehicle positioned further along the length of the conveyor.
Figure 2C:
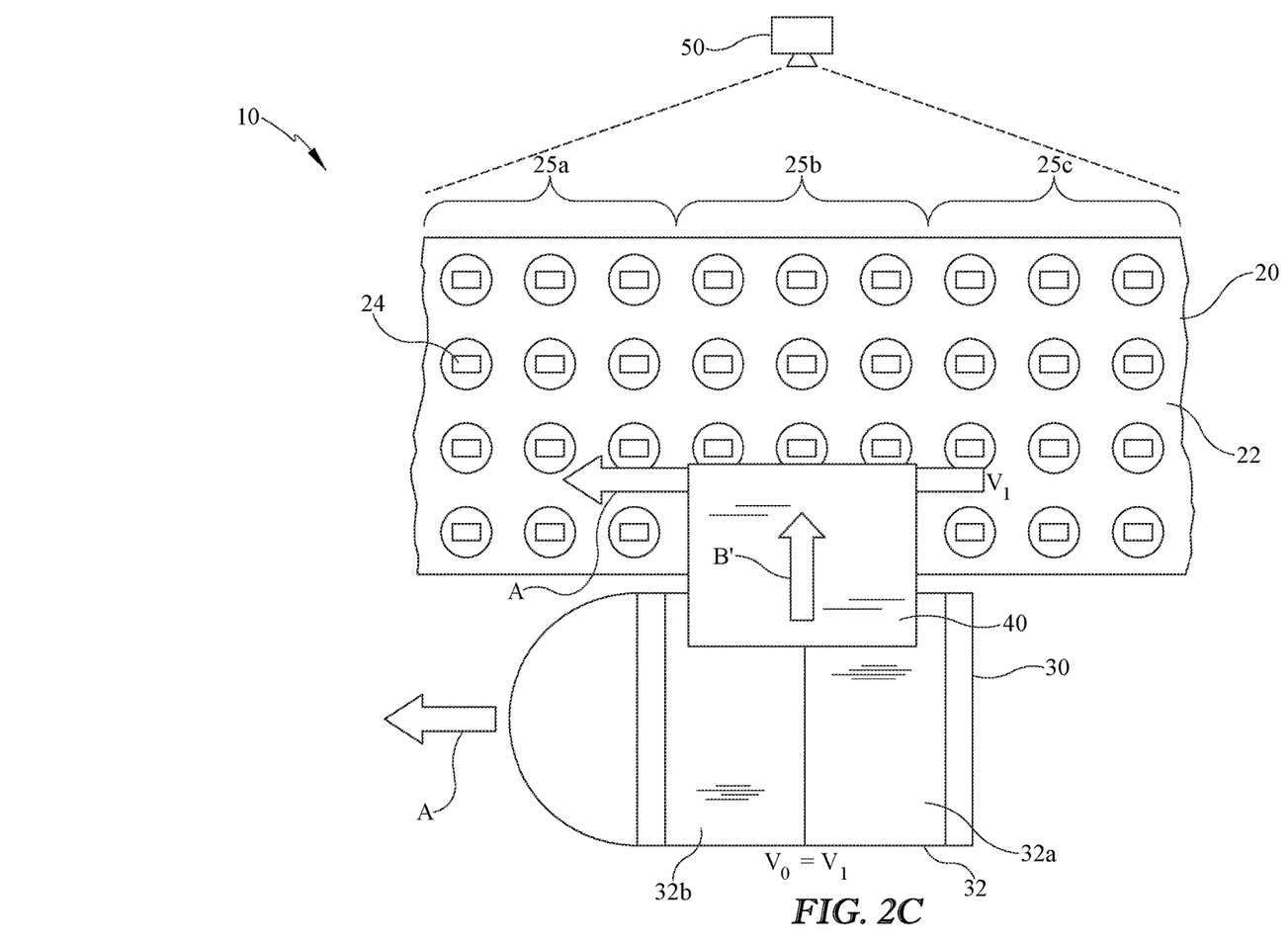
FIG. 2C is another schematic diagram of the exemplary parcel transfer system of FIG. 1 similar to FIG. 2B, but with the parcel or similar article being offloaded onto the conveyor.

Referring now to FIGS. 2C and 3, after communicating instructions to activate the first belt 32a and/or the second belt 32b of the secondary conveyor 32 of the SDV 30 and the subset(s) of rollers 24 in the target zone(s) of the conveyor 20, the one or more onboard sensors 35 of the SDV 30 and, in some embodiments, the one or more sensors 50 of the vision and control subsystem 100 collect new data (e.g., readings from the photoelectric sensor, new images, weight measurements, and/or pressure measurements) and transmit the same to the controller 60 for processing. Data from the one or more onboard sensors 35 and the one or more sensors 50 of the vision and control subsystem 100 may also be transmitted to the controller 60 for processing after allowing a suitable period of time for execution of the instructions from the controller 60 by the SDV 30 (i.e., first belt 32a and/or second belt 32b activation) and subset(s) of rollers 24 in the target zone(s). The foregoing routine is repeated until the controller 60 receives data from the one or more onboard sensors 35 of the SDV and/or the one or more sensors of the vision and control subsystem 100 indicating that the parcel 40 has been fully offloaded from the SDV 30 onto the conveyor 20. At such time, the controller 60 then communicates instructions which (i) deactivate the first belt 32a and/or the second belt 32b of the secondary conveyor 32, and (ii) deactivate the subset(s) of rollers 24 in the target zone(s).

Referring now to FIGS. 2A-C and 3, if, however, the controller 60 identifies that the SDV 30 and the target zone(s) of the conveyor 20 are not in side-by-side position, the controller 60 communicates instructions which cause the drive motor 38 of the SDV 30 to move the SDV 30 toward the target zone(s) of the conveyor 20 intended to receive the parcel 40, which, again, in this case, is the second zone 25b of the conveyor 20. Depending on the positioning of the SDV 30 relative to the target zone(s), the instructions communicated by the controller 60 may cause the drive motor 38 to change the direction of, accelerate, or decelerate the SDV 30. For instance, if the controller 60 identifies that the SDV 30 is traveling alongside the conveyor 20 at a position which is behind the target zone(s), the controller will communicate instructions which cause the SDV 30 to initially accelerate in the first direction of travel, A, to a velocity, $V_0$, that is greater than the velocity, $V_1$, at which the target zone(s) of the conveyor 20 is traveling (i.e., $V_0>V_1$). The controller 60 will then communicate instructions which cause SDV 30 to decelerate to a velocity equal to that of the velocity at which the target zone(s) is traveling (i.e., $V_0=V_1$), and then (i) activate the first belt 32a and/or the second belt 32b of the secondary conveyor 32, and (ii) activate the subset(s) of rollers 24 in the target zone(s) in the manner specified above.

Figure 2D:
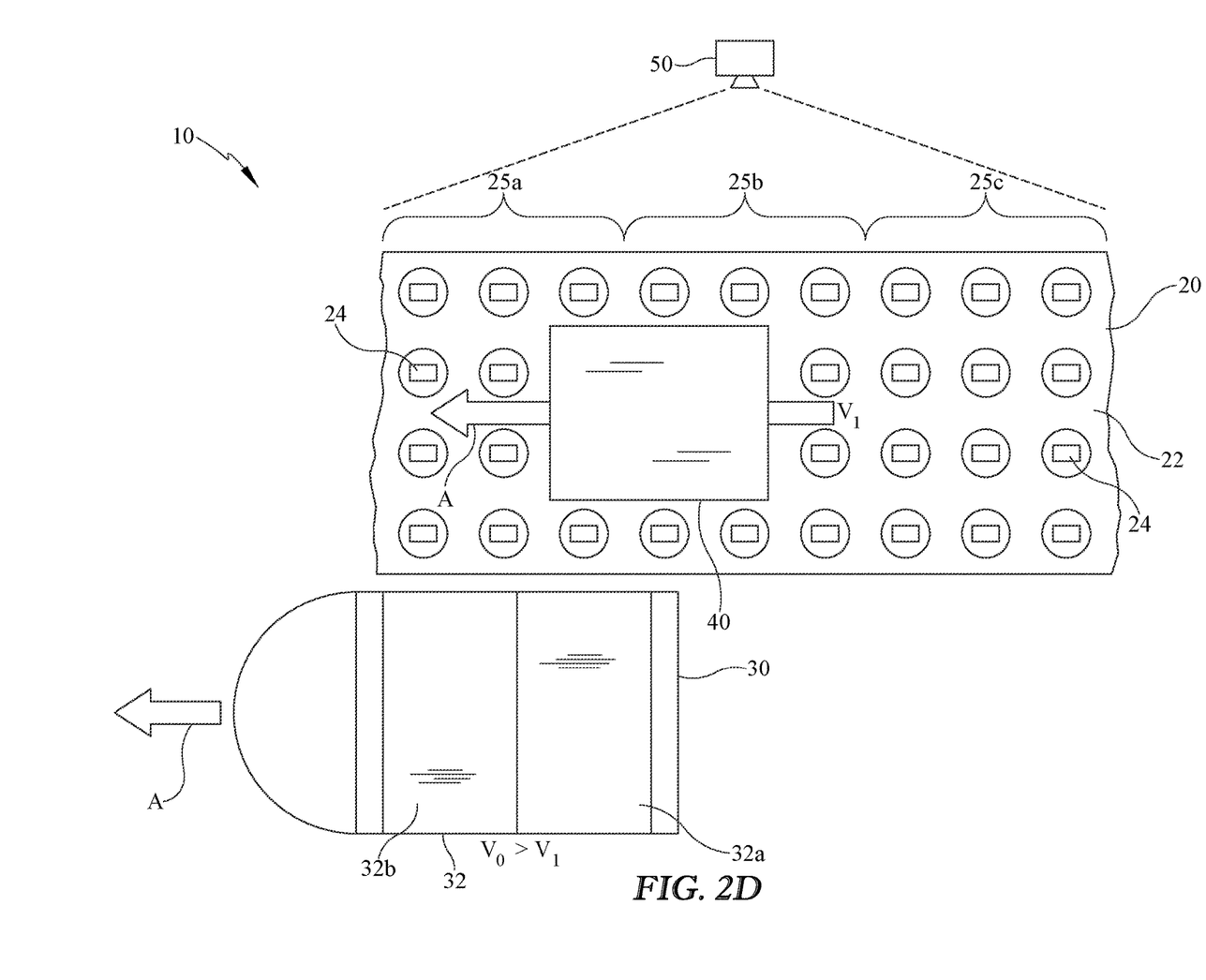
FIG. 2D is another schematic diagram of the exemplary parcel transfer system of FIG. 1 similar to 2C, but with the parcel or similar article fully offloaded onto the conveyor.

Referring now to FIGS. 2D and 3, once the controller 60 receives data from the one or more onboard sensors 35 and/or the one or more sensors of the vision and control subsystem 100 indicating that the parcel 40 has been fully offloaded from the SDV 30, the controller 60 may communicate instructions which cause the drive motor 38 to accelerate (i.e., $V_0>V_1$) and drive the SDV 30 away from the conveyor 20 to be loaded with additional parcels for delivery to the conveyor 20.

The foregoing process can be repeated until all parcels intended for delivery to conveyor 20 are transferred. To transfer a large volume of parcels to the conveyor 20, in some embodiments and implementations, the system 10 may include multiple SDVs 30. In one such embodiment and implementation, the controller 60 may process data provided by the GPS tracking chips of the respective SDVs and communicate instructions which cause one SDV to transfer a parcel loaded thereon to another SDV. In embodiments and implementations including multiple SDVs 30, the continued movement of the respective SDVs 30 and conveyor 20 during parcel transfer in the manner described above will serve to prevent traffic congestion at parcel transfer points along the conveyor 20 while simultaneously improving parcel transfer and sorting efficiency.

In some implementations, the SDV 30 may be initially loaded with a first parcel on the first belt 32a of the secondary conveyor 32 and a second parcel on the second belt 32b of the secondary conveyor 32. In such implementations, the first and second parcel can be sequentially offloaded onto the conveyor 20 by activating the first belt 32a and the subset(s) of rollers 24 in a target zone(s) at a first time and activating the second belt 32b and the subset(s) of rollers 24 in a target zone(s) at a second time in the manner described above prior to the SDV 30 driving away from the conveyor. Of course, in such implementations, the first parcel and the second parcel could be simultaneously offloaded from the SDV 30 by activating the first belt 32a and the second belt 32b of the secondary conveyor 32 at the same time.

Although addressed separately for clarity, it is appreciated that the implementation of the system 10 described above with respect to FIGS. 1 and 1A-D and the implementation of the system 10 described above with respect to FIGS. 2A-D are not necessarily mutually exclusive. In this regard, implementations are contemplated in which the conveyor 20 and SDV 30 are both configured to transport a parcel in a first direction of travel, A, before offloading it in a second direction of travel, B, B'. Indeed, in some implementations, the conveyor 20 and SDV 30 may both offload and receive a parcel prior to the SDV 30 driving away from the conveyor 20 to either deliver a parcel to its intended destination or to be loaded with another parcel intended for delivery to the conveyor 20. For instance, in some embodiments, the SDV 30 may first offload a parcel onto the conveyor 20 before subsequently receiving a parcel offloaded from the conveyor 20.

For ease of illustration, within FIGS. 1A-D and 2A-D, the parcel 40 is illustrated as being offloaded from or received on, depending on the implementation, a single side of the conveyor 20 and the SDV 30. However, one of skill in the art will appreciate that the parcel 40 may be offloaded from or received on, depending on the implementation, either side of the conveyor 20 and the SDV 30 without departing from the spirit or scope of the present invention. For instance, in some implementations, the conveyor 20 may offload one parcel from one side of the conveyor at a first time and offload another parcel from the other side of the conveyor at a second time. Such alternating offloading of parcels from the conveyor 20 is particularly advantageous to maintain a continuous flow of parcels on the conveyor 20. In other words, the parcels can be offloaded from the conveyor 20 one after another, to the left and to the right in an alternating pattern, allowing adequate space between SDVs 30 on either side of the conveyor 20 to operate and receive parcels.

Referring now specifically to FIG. 1, to prevent "dropping" of the parcel 40 when offloaded either from the conveyor 20 onto the SDV 30 (FIGS. 1A-D) or from the SDV 30 onto the conveyor 20 (FIGS. 2A-D) and potentially damaging the parcel 40, the upper surfaces of the conveyor 20 and the SDV 30 on which the parcel 40 is carried are preferably in a common plane (as indicated by dashed line X in FIG. 1).

One of ordinary skill in the art will recognize that additional embodiments and implementations are also possible without departing from the teachings of the present invention. This detailed description, and particularly the specific details of the exemplary embodiments and implementations disclosed herein, are given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A system for transferring a parcel, comprising:
a conveyor configured to transport the parcel in a first direction of travel and offload the parcel in a second direction of travel;
a self-driving vehicle configured to travel alongside the conveyor and receive the parcel as the parcel is offloaded from the conveyor; and
a vision and control subsystem operably connected to the conveyor and the self-driving vehicle, including
one or more sensors for acquiring data corresponding to the positioning of the parcel on the conveyor, and
a controller including a processor for executing instructions stored in a memory component to (i) receive and analyze data received from the one or more sensors and from the self-driving vehicle to identify the position of the self-driving vehicle relative to the parcel, (ii) communicate instructions to the self-driving vehicle which cause the self-driving vehicle to move toward the parcel based on the identified position of the self-driving vehicle relative to the parcel, and (iii) communicate instructions to the conveyor which cause the conveyor to offload the parcel in the second direction of travel.

2. The parcel transfer system as recited in claim 1, wherein the second direction of travel is perpendicular to the first direction of travel.

3. The parcel transfer system as recited in claim 1, wherein the conveyor includes a belt driven in the first direction of travel and a plurality of rollers configured to be selectively activated to offload the parcel in the second direction of travel.

4. The parcel transfer system as recited in claim 3, wherein subsets of rollers within the plurality of rollers fall within multiple zones of the conveyor.

5. The parcel transfer system as recited in claim 4, wherein the processor is further configured to execute instructions stored in the memory component to communicate instructions to the conveyor which cause only the rollers in one or more of the multiple zones in which the parcel is located to be activated when the self-driving vehicle is in a side-by-side position with the parcel.

6. The parcel transfer system as recited in claim 1, wherein the self-driving vehicle includes a secondary conveyor configured to move the parcel away from the conveyor.

7. The parcel transfer system as recited in claim 6, wherein the secondary conveyor includes multiple zones, with each respective zone of the multiple zones of the secondary conveyor configured to be selectively activated to move the parcel away from the conveyor.

8. The parcel transfer system as recited in claim 1, wherein an upper surface of the conveyor configured to carry the parcel and an upper surface of the self-driving vehicle configured to receive the parcel are in a common plane as the parcel is offloaded from the conveyor.

9. The parcel transfer system as recited in claim 1, wherein the processor is further configured to execute instructions stored in the memory component to communicate instructions to the self-driving vehicle which cause the self-driving vehicle to reach a side-by-side position with the parcel and to maintain a velocity corresponding to a velocity at which a belt of the conveyor is driven in the first direction of travel as the parcel is offloaded from the conveyor.

10. A system for transferring a parcel, comprising:
a self-driving vehicle configured to transport the parcel in a first direction of travel and offload the parcel in a second direction of travel;
a conveyor configured to receive the parcel as the parcel is offloaded from the self-driving vehicle; and
a vision and control subsystem operably connected to the self-driving vehicle and the conveyor, including
one or more sensors for acquiring data from the conveyor, and
a controller including a processor for executing instructions stored in a memory component to (i) receive and analyze data from the one or more sensors to identify a target zone of the conveyor and to identify the position of the self-driving vehicle relative to the target zone, (ii) communicate instructions to the self-driving vehicle which cause the self-driving vehicle to move toward the target zone based on the identified position of the self-driving vehicle relative to the target zone, and (iii) communicate instructions to the self-driving vehicle which cause the self-driving vehicle to offload the parcel in the second direction of travel to the target zone.

11. The parcel transfer system as recited in claim 10, wherein the second direction of travel is perpendicular to the first direction of travel.

12. The parcel transfer system as recited in claim 10, wherein the self-driving vehicle includes a secondary conveyor including multiple zones, with each respective zone of the multiple zones of the secondary conveyor configured to be selectively activated to offload the parcel in the second direction of travel.

13. The parcel transfer system as recited in claim 12, wherein the processor is further configured to execute instructions stored in the memory component to communicate instructions to the self-driving vehicle which cause only the zones of the secondary conveyor in which the parcel is located to be activated.

14. The parcel transfer system as recite in claim 10, wherein the conveyor includes a belt and a plurality of rollers configured to be selectively activated to move the parcel away from the self-driving vehicle.

15. The parcel transfer system as recited in claim 14, wherein subsets of rollers within the plurality of rollers fall within multiple zones of the conveyor, and wherein the processor is further configured to execute instructions stored in the memory component to communicate instructions to the conveyor which cause only certain subsets of rollers to be activated as the parcel is offloaded by the self-driving vehicle.

16. The parcel transfer system as recited in claim 10, wherein a surface of the self-driving vehicle configured to carry the parcel and a surface of the conveyor configured to receive the parcel are in a common plane as the parcel is offloaded from the self-driving vehicle.

* * * * *